PHOTOMECHANICAL REPRODUCTION

Filed Jan. 15, 1951

Inventor
Donald Charles Gresham
by
Stevens, Davis, Miller & Mosher
his attorneys // United States Patent Office 2,715,578

Patented Aug. 16, 1955

2,715,578

PHOTOMECHANICAL REPRODUCTION

Donald Charles Gresham, London, England, assignor to McCorquodale Company Limited, London, England, a British company Application January 15, 1951, Serial No. 206,119

Claims priority, application Great Britain February 8, 1950

11 Claims. (Cl. 95—5.1)

Figures 1A, 1B, 1C, 1D, 1E:
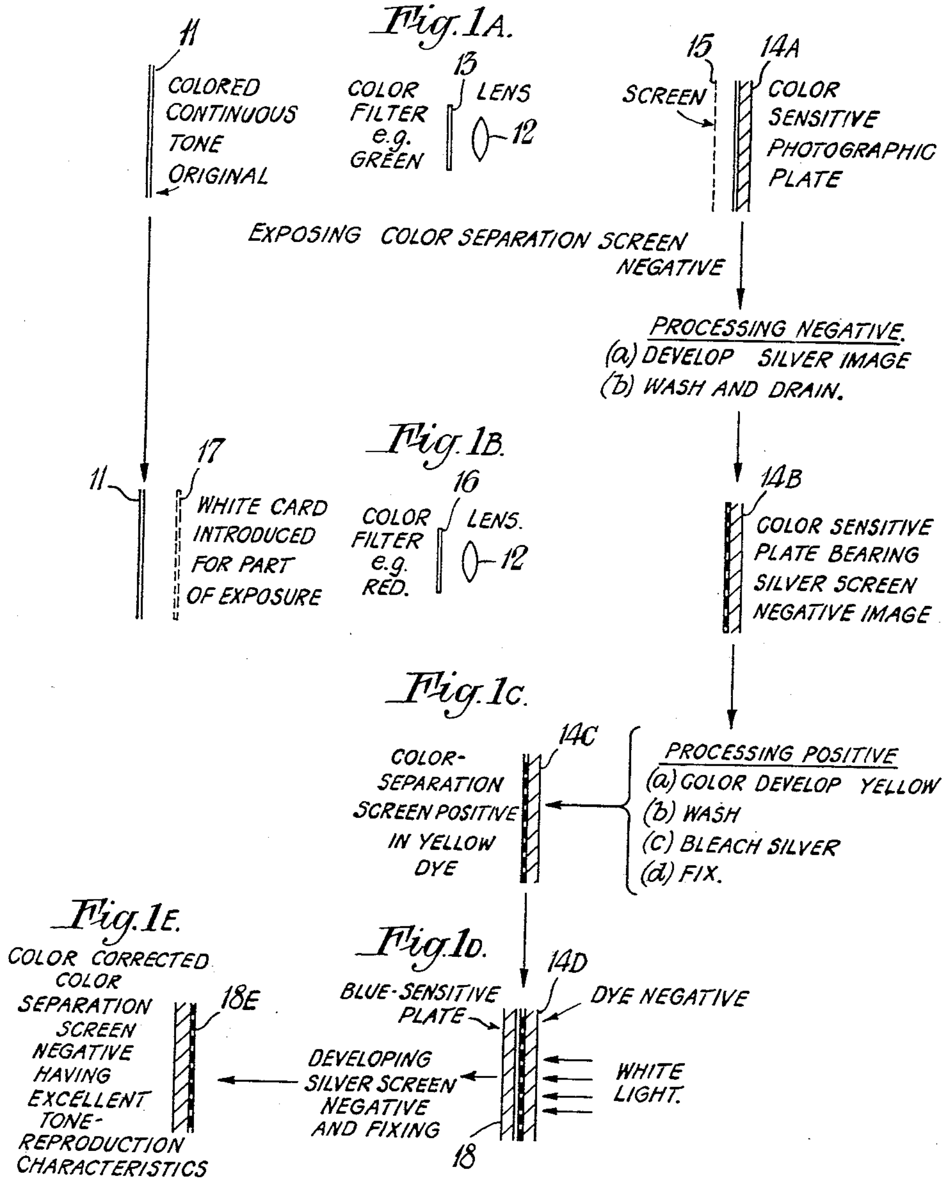

This invention relates to photomechanical reproduction and more particularly to improvements in the half-tone block and bi-metal litho processes for colour reproduction.

In the half-tone block process, as normally carried out, a screen negative is made from the original in a process camera and this is used for making the half-tone block. When the process is correctly carried out substantially correct tone-reproduction is obtained due mainly to the fortunate coincidence that the reduction in dot size which occurs during the etching of a half-tone block and the ink-squash which occurs during printing together just about balance the errors inherent in the screen negative.

In the production of screen negatives for colour reproduction, however, a more elaborate procedure is employed and usually this involves colour masking if extensive retouching is to be avoided. Thus the general method involves producing first a set of continuous tone separation negatives then producing appropriate colour-correction masks, then corrected continuous tone positives, and from these last are made the final screen negatives. It would clearly be advantageous to shorten this procedure by the use of a photographic reversal technique, whereby colour corrected screen positives could be obtained directly (from which screen negatives could be contact-printed) but the usual reversal technique has certain disadvantages. Thus the usual reversal technique consists in exposing a photographic plate behind a half-tone screen to light from the original subject, developing the negative latent image thus obtained to silver, bleaching the silver, for example in acid potassium dichromate, subjecting the plate to uniform exposure to white light (thus rendering developable the silver halide which was unaffected by the original exposure) and developing the newly formed latent image to silver. The image thus obtained is complementary to the original negative image, i. e., it is a positive image. Unfortunately it is necessary for the best results that a very full exposure be given in the first stage in order to achieve clear highlights in the positive and variations in emulsion thickness tend to result in variations in dot size in the developed positive.

According to the present invention a process for the production of screen positives for use in the production of screen negatives for the half-tone block and bi-metal litho processes comprises exposing a photographic plate or film behind a half-tone screen to light from an original subject, developing the latent image obtained in a devolper giving only a silver image, exposing the plate or film to light incident on the same side thereof as the original exposure, re-developing the plate or film, thereby producing a positive image in silver, producing a coloured image in situ with said positive image and removing silver and silver salts from the product.

The product thus obtained is a screen positive in which the image is in colour only.

In the preferred form of the invention, with which it will be particularly described, the redevelopment is effected by means of an aromatic primary amino developing agent in the presence of a colour former which couples with the oxidation products of such developer, formed during deveolpment to form a dyestuff image in situ with the developed positive silver image.

According further to the present invention a half-tone block process comprises producing silver screen negatives by contact-printing from the said coloured screen positives and preparing half-tone blocks from the screen negatives thus obtained.

The foregoing procedure takes much less time than the ordinary process referred to above. It does not, however, effect any colour correction and according to a further feature of the present invention now to be described, the said process is modified for the preparation of colour-corrected separation screen negatives for colour reproduction.

Considered in its simplest form the process requires the production of three screen negatives corresponding to the usual primary responses of the original, i. e., red, green and blue. Plates are made from these and printed respectively in superposition in cyan, magenta and yellow. Usually, in order to strengthen the record obtained, a black and white record, the so-called "black printer," is included.

Unfortunately printing inks and especially the available cyan and magenta inks, do not accord with the requirements of these subtractive colours. The cyan inks, which should absorb red absolutely and transmit blue and green freely, usually have an undesirably high absorption of green light, to such an extent in fact that such inks are usually called "blue" inks in the trade. The magenta inks, which should absorb absolutely in the green and transmit freely in the red and blue usually have an undesirably high absorption of blue light, to such an extent that these inks are usually referred to as "red" inks in the trade. Accordingly it is always necessary to effect a very considerable amount of retouching on the screen separation negatives in order that a satisfactory colour reproduction should be finally obtained.

By reason of the inks used, the screen negative recording the red response is usually referred to as the "Blue Printer" negative, that recording the green response is called the "Red Printer" negative and that recording the blue response is called the "Yellow Printer" negative.

According to the present invention screen separation positives are made by the technique hereinbefore described and imperfections in the printing inks to be used are balanced by effecting a correction of each separation image at the reversal exposure stage by printing a positive image on the hitherto unused areas of the emulsion by a reversal exposure which is varied from point to point over the area of the image in correspondence with variations in the colour response of the original in the waveband of that other of the separation records which is to be printed in an ink which absorbs undesirably in the waveband which the first separation record records. Subsequently screen negatives are made by contact from the screen positives thus obtained.

Generally, in ordinary practice since, as explained above, the red record is to be printed in cyan ink which absorbs undesirably in the green, it is necessary to effect part of the re-exposure of the green record to the original through a red filter. In addition, since the green record is to be printed in magenta ink which absorbs undesirably in the blue, it is necessary to effect part of the re-exposure of the blue record to the original through a green filter. The blue record, on the other hand, is to be printed in yellow ink, which is usually spectrally satisfactory so that it is usually satisfactory to effect the re-exposure of the red record through a red filter.

In carrying out this aspect of the invention the simple procedure is to effect the re-exposure of the blue separation screen record partially to the original subject via a green tri-colour filter, to effect the re-exposure of the green separation record partially to the original subject via a red filter and to effect the re-exposure of the red separation record partially to the original subject via a red filter. In this last case no colour correction is effected.

The colour of the dye screen positive is of no importance providing that the screen negative is printed from it by means of light which it absorbs. Accordingly any of the wide range of well-known colour formers may be employed. Examples may be selected from the list given in British Journal of Photography, volume 85, p. 647 et seq.

The nature of the process is further illustrated by the accompanying drawing which is in the nature of a flow-chart. Referring to this drawing, which is made up of five parts indicated as Figures 1A, 1B, 1C, 1D and 1E, an original 11 is copied in the camera (illustrated by lens 12) via a filter 13 on to a plate 14 via a screen 15. The plate 14A is developed to form a silver image, washed and drained. It is then, identified as 14B, replaced in the camera and given a second exposure partly to the original 11 and partly to a white card 17, via a colour filter 16 selected for colour correction on the basis indicated above. The plate 14B is then colour developed yellow, washed, the silver removed and fixed, yielding the plate, now identified as 14C carrying only a positive screen colour separation image in yellow dye. In the next stage this plate identified as 14D is contact printed on to a blue-sensitive plate 18 and the plate 18 is developed to a silver screen negative and fixed. This yields the final product, identified as 18E which is a colour-corrected colour separation screen negative of excellent tone reproduction characteristics.

The following example will serve to illustrate the invention. The lens apertures are given as a fraction of the extension *v* of the camera and the distance of the screen from the plate is 40 times the length of the side of a single screen aperture. Although in this example photographic plates are used flat photographic film is also capable of similar use. The conditions of first development in the M. Q. developer given in the example will yield a gamma value of about 3.0 on an average batch of the material used but on any batch of the material the gamma value will be at least approximately 2.5 as will be appreciated by those skilled in the art. The conditions of second development in the color developer given in the example will yield a dye image with a gamma value of about 3.0 on an average batch of the material but on any batch the gamma value will be at least approximately 2.5.

EXAMPLE

*Production of a set of colour-corrected screen negatives*

A. PRODUCTION OF THE "BLUE PRINTER" NEGATIVE

1. A panchromatic plate having an emulsion of high contrast was exposed behind a half-tone screen in a process camera via a tri-colour red filter (Wratten 29). The word "Wratten" is a registered trademark. An exposure of 40 seconds was given at lens aperture v/32 and then a further exposure to uniform light for 5 seconds at aperture v/64 was given. This last is conveniently effected in practice by placing a white sheet over the original in the camera.

2. The plate was developed for 4¼ minutes at 65° F. in a normal metol hydroquinone developer.

3. The plate was immersed in a stop bath of 2% acetic acid for ½ minute.

4. The plate was washed.

5. The plate was rinsed in a very dilute solution of a wetting agent and drained.

6. The plate was then replaced in the camera and exposed for 380 seconds via a red filter (Wratten 23A) to the original subject. A further exposure to uniform light of 12 seconds was then given.

7. The plate was then developed for 6½ minutes at 65° F. in a developer made up as follows:

(*a*)

| | | |
|---|---|---|
| N.N-diethyl-p-phenylene diamine sulphur dioxide reaction product | g | 4.5 |
| Sodium sulphate (anhydrous) | g | 18.5 |
| Potassium bromide | g | 4 |
| Water to make | cc | 2250 |

(*b*)

| | | |
|---|---|---|
| 10% solution of acetone of 2:5 dichloraceto-acetanilide | cc | 200 |
| 10% sodium hydroxide solution | cc | 140 |
| Sodium carbonate (anhydrous) | g | 132 |
| Water to make | cc | 2250 |

For use, one part of (*a*) is mixed with one part of (*b*).

8. The plate was fixed in sodium thiosulphate solution.

9. The plate was bleached by inspection, in daylight, in a solution containing potassium ferricyanide and potassium bromide and re-fixed in sodium thiosulphate solution.

10. The plate was washed and dried.

11. The plate was then printed by contact in a vacuum printing frame on to a blue-sensitive "process" plate, the exposure being effected by means of 25 w. electric lamp located behind a 3-inch square aperture at 4½ feet from the frame, for 25 seconds.

12. The printed plate was then developed for 3 minutes at 65° F. in a caustic soda-hydroquinone developer.

13. The plate was fixed, washed and dried.

B. PRODUCTION OF THE "RED PRINTER" NEGATIVE

1. A similar panchromatic plate was exposed behind a half-tone screen in a process camera via a tri-colour green filter (Wratten 61). An exposure of 32 seconds was given at lens aperture v/32 followed by a further 4 seconds exposure to uniform light at aperture v/64.

2 to 13. These steps were the same as for the "Blue Printer" negative.

C. PRODUCTION OF THE "YELLOW PRINTER" NEGATIVE

1. This step was similar to Step 1 for the "Red Printer" negative except that a tri-colour blue filter was used (Wratten 49).

2 to 5. These steps were as given for the "Blue Printer" negative.

6. The plate was replaced in the camera and exposed for 415 seconds via a green filter (Wratten 56) to the original subject. A further exposure to uniform light of 13 seconds was then given.

7 to 13. These steps were as given for the "Blue Printer" negative.

The negatives thus obtained were printed down on copper and etched, face downwards, in a still bath of feric chloride. The resulting plates when printed gave a good recording of the original coloured subject without the necessity for hand retouching. The result was found to be improved by including a "black printer" negative which may be made by any of the usual methods.

The foregoing method presents important advantages over the technique hitherto employed. Thus it requires very much less time than the usual masking system and uses only half the quantity of photographic material. No prism is required in the camera as the contact negative is suitably laterally reversed without its use.

It will be noted that in the foregoing example the photographic material specified has an emulsion with "high contrast" and when this expression is used in the appended claims it has reference to one of the many commercially available materials made primarily for the production of line or screen records. At the present time these fall into classes which I define as follows: (*a*) Materials which, when exposed to white light and developed for 3 minutes at 68° F. in Kodak developer D11, yield a gamma value of at least 3.5; (*b*) Materials of the "Kodalith" type which have silver chloride emulsions and when developed in special developers containing formaldehyde or reaction products of formaldehyde yield a gamma value of at least 4.0.

Where I refer to a gamma value of a dye image I refer to a figure derived by developing a step wedge on the material to be used in the color developer to be used, bleaching the silver image in the bleaching bath to be used, fixing out all the remaining silver halide in a fixing bath which does not appreciably affect the dye image, measuring the densities of the wedge steps through a filter of complementary color to the dye image, plotting these densities against the logarithms of the exposures which produced them and deriving the gradient value from the curve in the usual way.

I claim:

1. Process for the production of screen positives for use in the production of screen negatives for the half-tone block and bi-metal litho processes which comprises exposing a photographic element having an emulsion of high contrast behind a half-tone screen to light from an original subject, developing the screen latent image obtained to a gamma of at least approximately 2.5 in a developer giving only a silver image, reversal exposing the element to light incident on the same side thereof as the original exposure, re-developing the element in an aromatic primary amino developing agent in the presence of a colour former which couples with the oxidation products of such developer formed during development to form a dye image in situ with the developed positive silver image, said development being such as to yield a dye image with a gamma value of at least approximately 2.5, and removing silver and silver salts from the product.

2. Process for the production of a half-tone block which comprises producing a coloured screen positive by exposing a photographic element having an emulsion of high contrast behind a half-tone screen to light from an original subject, developing the screen latent image obtained to a gamma of at least approximately 2.5 in a developer giving only a silver image, reversal exposing the element to light incident on the same side thereof as the original exposure, redeveloping the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, printing the coloured screen positive thus obtained by contact onto a phoetographic element to produce a screen negative in silver and preparing a half-tone block from the screen negative thus obtained.

3. Process for the production of a set of screen positive records recording different colour sensations of an original multicoloured subject, for use in the production of screen negatives for the half-tone block and bi-metal litho processes in which the half-tone blocks and bi-metal litho plates are to be printed in different coloured inks for the reproduction of the original subject, at least one of which inks absorbs undesirably in a waveband which it should freely transmit, which comprises producing the separate screen positive records each by exposing a photographic element having an emulsion of high contrast behind a half-tone screen to light from an original subject, developing the screen latent image obtained to a gamma of at least 2.5 in a developer giving only a silver image, reversal exposing the element to light incident on the same side thereof as the original exposure, redeveloping the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure, in the case of the separation record which records the colour response of the original in the waveband which is undesirably absorbed by the printing ink to be used with the printing element derived from one other of the separation records, being varied over the area of the image in correspondence with variations in the colour response of the original in the waveband of which said other separation record records the response of the original.

4. Process for the production of a set of three screen positive records recording the blue, green and red sensations of an original multicoloured subject for use in the production of screen negatives for the half-tone block and bi-metal litho processes in which the half-tone blocks and bi-metal litho plates are to be printed in yellow, magenta and cyan inks of which the cyan ink has an undesirably high absorption for green light, which comprises producing the separate screen positive records each by exposing a photographic element having an emulsion of high contrast behind a half-tone screen to light from an original subject, developing the screen latent image obtained to a gamma of at least approximately 2.5 in a developer giving only a silver image, reversal exposing the element to light incident on the same side thereof as the original exposure, re-developing the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure in the case of the green separation record being effected at least partly to light from the original subject passing through a red filter.

5. Process for the production of a set of three screen positive records recording the blue, green and red sensations of an original multicoloured subject, for use in the production of screen negatives for the half-tone block and bi-metal litho processes in which the half-tone blocks and bi-metal litho plates are to be printed in yellow, magenta and cyan inks of which the magenta ink has an undesirably high absorption for blue light, which comprises producing the separate screen positive records each by exposing a photographic element having an emulsion of high contrast behind a half-tone screen to light from an original subject, developing the screen latent image obtained to a gamma of at least 2.5 in a developer giving only a silver image, reversal exposing the element to light incident on the same side thereof as the original exposure, re-developing the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure in the case of the blue separation record being effected at least partly to light from the original subject passing through a green filter.

6. Process for the production of a set of three screen positive records recording the blue, green and red sensations of an original multicoloured subject for use in the production of screen negatives for the half-tone block and bi-metal litho processes in which the half-tone blocks and bi-metal litho plates are to be printed in yellow, magenta and cyan inks of which the cyan ink has an undesirably high absorption for green light, and of which the magenta ink has an undesirable absorption for blue light, which comprises producing the separate screen positive records, each by exposing a photographic element having an emulsion of high contrast behind a half-tone screen to light from an original subject, developing the screen latent image obtained to a gamma of at least 2.5 in a developer giving only a silver image, reversal exposing the element to light incident on the same side thereof as the original exposure, redeveloping the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure in the case of the green separation record being effected at least partly to light from the original subject passing through a red filter, the said reversal exposure in the case of the blue separation record being effected at least partially to light from the original subject passing through a green filter and the said reversal exposure in the case of the red separation record being effected at least partially to light from the original subject passing through a red filter.

7. Process for the production of a set of half-tone blocks for colour reproduction using differently coloured inks of which at least one absorbs undesirably in a waveband which it should freely transmit, which comprises producing a set of separate screen positive records each by exposing a photographic element having an emulsion of high contrast behind a half-tone screen to light from an original subject, developing the screen latent image obtained to a gamma of at least 2.5 in a developer giving only a silver image, reversal exposing the element to light incident on the same side thereof as the original exposure, redeveloping the element thereby producing a positive image in silver, producing a coloured image in situ with said positive image said development being such as to yield a dye image with a gamma value of at least approximately 2.5 and removing silver and silver salts from the product, the said reversal exposure in the case of the separation record which records the colour response of the original in the waveband which is undesirably absorbed by the printing ink to be used with the printing element derived from one other of the separation records being varied over the area of the image in correspondence with variations in the colour response of the original in the waveband of which said other separation record records the response of the original, printing the colour screen positive thus obtained by contact onto photographic elements to produce corresponding screen negative records in silver and preparing half-tone blocks from the screen negatives thus obtained.

8. Process for the production of a set of half-tone blocks for colour reproduction using differently coloured inks of which at least one absorbs undesirably in a waveband which it should freely transmit, which comprises producing a set of separate screen positive records each by exposing a photographic element having an emulsion of high contrast behind a half-tone screen to light from an original subject, developing the screen latent image obtained to a gamma of at least approximately 2.5 in a developer giving only a silver image, reversal exposing the element to light incident on the same side thereof as the original exposure redeveloping the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure, in the case of the separation record which records the colour response of the original in the waveband which is undesirably absorbed by the printing ink to be used with the printing element derived from one other of the separation records, being varied over the area of the image in correspondence with variations in the colour response of the original in the waveband of which said other separation record records the response of the original, printing the coloured screen positives thus obtained by contact onto photographic elements to produce corresponding screen negative records in silver and preparing half-tone blocks from the screen negatives thus obtained.

9. Process for the production of a set of half-tone blocks for colour reproduction using yellow, magenta and cyan printing inks of which the cyan ink has an undesirably high absorption for green light, which comprises producing the separate screen positive records each by exposing a photographic element having an emulsion of high contrast behind a half-tone screen to light from an original subject, developing the screen latent image obtained to a gamma of at least approximately 2.5 in a developer giving only a silver image, reversal exposing the element to light incident on the same side thereof as the original exposure, redeveloping the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure in the case of the green separation record being effected at least partly to light from the original subject passing through a red filter, printing the coloured screen positives thus obtained by contact onto photographic elements to produce corresponding screen negative records in silver and preparing half-tone blocks from the screen negatives thus obtained.

10. Process for the production of a set of half-tone blocks for colour reproduction using yellow, magenta and cyan printing inks of which the magenta ink has an undesirably high absorption for blue light, which comprises producing the separate screen positive records each by exposing a photographic element having an emulsion of high contrast behind a half-tone screen to light from an original subject, developing the screen latent image obtained to a gamma of at least approximately 2.5 in a developer giving only a silver image, reversal exposing the element to light incident on the same side thereof as the original exposure, redeveloping the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure in the case of the blue separation record being effected at least partly to light from the original subject passing through a green filter, printing the coloured screen positives thus obtained by contact onto photographic elements to produce corresponding screen negative records in silver and preparing half-tone blocks from the screen negatives thus obtained.

11. Process for the production of a set of half-tone blocks for colour reproduction using yellow, magenta and cyan printing inks of which the cyan ink has an undesirably high absorption for green light and of which the magenta ink has an undesirable absorption for blue light which comprises producing the separate screen positive records each by exposing a photographic element having an emulsion of high contrast behind a half-tone screen to light from an original subject, developing the screen latent image obtained to a gamma of at least approximately 2.5 in a developer giving only a silver image, reversal exposing the element to light incident on the same side thereof as the original exposure, redeveloping the element in an aromatic primary amino developing agent in the presence of a colour former which couples with the oxidation products of such developer formed during development to form a dye image in situ with the developed positive silver image said development being such as to yield a dye image with a gamma value of at least approximately 2.5, and removing silver and silver salts from the product, the said reversal exposure in the case of the green separation record being effected at least partly to light from the original subject passing through a red filter, the said reversal exposure in the case of the blue separation record being effected at least partially to light from the original subject passing through a green filter and the said reversal exposure in the case of the red separation record being effected at least partially to light from the original subject passing through a red filter, printing the colour screen positives thus obtained by contact onto photographic elements to produce corresponding screen negative records in silver and preparing half-tone blocks from the screen negatives thus obtained.

References Cited in the file of this patent

UNITED STATES PATENTS

| | | |
|---|---|---|
| 1,939,231 | Seymour | Dec. 12, 1933 |
| 2,165,407 | Murray | July 11, 1939 |
| 2,182,814 | Marasco | Dec. 12, 1939 |

FOREIGN PATENTS

| | | |
|---|---|---|
| 384,364 | Great Britain | Dec. 8, 1932 |
| 475,346 | Great Britain | Nov. 15, 1937 |
| 593,839 | Germany | Mar. 6, 1934 |

OTHER REFERENCES

"Color Proofs from Positives," Modern Lithography, March 1948, pages 52 and 53.